US009207000B2

(12) United States Patent  
Kruse

(10) Patent No.: US 9,207,000 B2  
(45) Date of Patent: Dec. 8, 2015

(54) SOLAR APPARATUS SUPPORT STRUCTURES AND SYSTEMS

(76) Inventor: Darin Kruse, Simi Valley, CA (US)

( * ) Notice: Subject to any disclaimer, the term of this patent is extended or adjusted under 35 U.S.C. 154(b) by 0 days.

(21) Appl. No.: 13/592,214

(22) Filed: Aug. 22, 2012

(65) Prior Publication Data

US 2013/0048582 A1    Feb. 28, 2013

Related U.S. Application Data

(60) Provisional application No. 61/526,188, filed on Aug. 22, 2011, provisional application No. 61/563,439, filed on Nov. 23, 2011.

(51) Int. Cl.
*A47G 19/08* (2006.01)
*F24J 2/54* (2006.01)
*F24J 2/52* (2006.01)

(52) U.S. Cl.
CPC ............ *F24J 2/541* (2013.01); *F24J 2/5413* (2013.01); *F24J 2/525* (2013.01); *F24J 2/5232* (2013.01); *Y02E 10/47* (2013.01); *Y10T 29/49625* (2015.01)

(58) Field of Classification Search
CPC ......... F24J 2/525; F24J 2/5252; F24J 2/5254; F24J 2/526; F24J 2/5262; F24J 2/5413; F24J 2/5237; F24J 2002/5451; F24J 2002/5468; F24J 2002/5486; F24J 2002/5277; F24J 2/5232; F24J 2/541; H01L 31/0422; Y02E 10/47; Y02E 10/50; A47B 97/08; A47B 97/00; F16L 3/00; F16L 1/026; F16M 11/00; F16M 11/32; F16M 11/42; Y10T 29/49625

USPC .............. 52/173.3, 292–299; 248/676–679, 248/163.1, 431, 166, 173; 182/153, 155; 211/204, 182

See application file for complete search history.

(56) References Cited

U.S. PATENT DOCUMENTS

| | | | |
|---|---|---|---|
| 812,344 A * | 2/1906 | Howser | 182/153 |
| 1,805,265 A | 5/1931 | Taussig | |
| 2,924,414 A * | 2/1960 | Tesdal | 248/165 |
| 3,148,746 A * | 9/1964 | Joculano | 182/153 |
| 3,385,070 A | 5/1968 | Jackson | |
| 3,464,216 A | 9/1969 | Turzillo | |
| 3,767,149 A * | 10/1973 | Hill | 248/49 |
| 3,937,607 A * | 2/1976 | Rodormer | 425/111 |
| 4,108,154 A * | 8/1978 | Nelson | 126/576 |
| 4,223,214 A * | 9/1980 | Dorian et al. | 250/203.4 |
| 4,404,465 A * | 9/1983 | Miller | 250/203.4 |
| 4,832,001 A * | 5/1989 | Baer | 126/579 |

(Continued)

FOREIGN PATENT DOCUMENTS

| | | |
|---|---|---|
| JP | 07-286327 | 10/1995 |
| WO | 2013/028797 | 2/2013 |

OTHER PUBLICATIONS

International Search Report dated Jan. 30, 2013 for International Application PCT No. PCT/US2012/051932.

(Continued)

*Primary Examiner* — Korie H Chan
(74) *Attorney, Agent, or Firm* — K&L Gates LLP; Louis C. Cullman; Brian J. Novak

(57) ABSTRACT

Described herein are solar apparatus support structures, apparatus and systems as well as methods of installing and using the solar apparatus structures, apparatus and systems.

17 Claims, 7 Drawing Sheets

(56) References Cited

U.S. PATENT DOCUMENTS

| | | | |
|---|---|---|---|
| 5,125,613 A * | 6/1992 | Albee et al. | 248/464 |
| 5,228,924 A * | 7/1993 | Barker et al. | 136/246 |
| 5,249,892 A | 10/1993 | Fox et al. | |
| 5,437,526 A | 8/1995 | Herbst | |
| 5,467,842 A * | 11/1995 | Meloy | 182/153 |
| 5,839,540 A * | 11/1998 | Russell | 182/153 |
| 6,017,007 A * | 1/2000 | Muzzi | 248/163.2 |
| 6,354,766 B1 | 3/2002 | Fox | |
| 6,425,713 B2 | 7/2002 | Fox et al. | |
| 6,563,040 B2 * | 5/2003 | Hayden et al. | 136/244 |
| 6,688,815 B2 | 2/2004 | Fox | |
| 6,722,357 B2 * | 4/2004 | Shingleton | 126/600 |
| 7,226,246 B2 | 6/2007 | Fox | |
| 7,326,004 B2 | 2/2008 | Wissmann et al. | |
| 7,413,159 B2 * | 8/2008 | Liang et al. | 248/676 |
| 7,472,666 B1 * | 1/2009 | Richard et al. | 114/361 |
| D586,737 S * | 2/2009 | Shugar et al. | D13/102 |
| 7,488,139 B2 | 2/2009 | Wissmann | |
| 7,604,437 B2 | 10/2009 | Wissmann et al. | |
| 7,901,159 B2 | 3/2011 | Fox | |
| 8,484,906 B1 * | 7/2013 | Tarr | 52/63 |
| 2003/0005953 A1 * | 1/2003 | Erbetta et al. | 135/151 |
| 2004/0115011 A1 | 6/2004 | Fox | |
| 2007/0269273 A1 | 11/2007 | Henderson | |
| 2008/0193223 A1 | 8/2008 | Wissmann et al. | |
| 2008/0245360 A1 * | 10/2008 | Almy et al. | 126/600 |
| 2009/0032014 A1 * | 2/2009 | Meydbray | 126/608 |
| 2009/0311050 A1 | 12/2009 | Martin, Sr. | |
| 2010/0028087 A1 | 2/2010 | Wissmann | |
| 2010/0089389 A1 * | 4/2010 | Seery et al. | 126/608 |
| 2010/0178114 A1 * | 7/2010 | Reeves | 405/232 |
| 2010/0329798 A1 | 12/2010 | Maher et al. | |
| 2011/0020069 A1 | 1/2011 | Richman | |
| 2011/0052330 A1 | 3/2011 | Wissmann et al. | |
| 2013/0048583 A1 | 2/2013 | Kruse | |
| 2013/0051927 A1 | 2/2013 | Kruse | |

OTHER PUBLICATIONS

Rammed Aggregate Pier® Systems: Overview. Geopier Foundation Company. Accessed Mar. 10, 2011. http://www.geopier.com/index.asp?id=71.

Rammed Aggregate Pier® Systems: Vertical Ramming Makes the Difference: Applications. Geopier Foundation Company. Accessed Mar. 10, 2011. http://www.geopier.com/index.asp?id=28.

Rammed Aggregate Piers. The Geopier® Construction Process. Geopier Foundation Company.

The Geopier® System: Geopier® Overview. Geopier Foundation Company. Accessed Mar. 10, 2011. http://www.geopier.com/index.asp?id=11.

The Impact® System: Impact® Overview. Geopier Foundation Company. Accessed Mar. 10, 2011. http://www.geopier.com/index.asp?id=64.

Kruse et al., Post Tesnsion Shallow Gravel col. (PTSGC) Reaction Plate Design. Cobalt Construction Company, 2011.

* cited by examiner

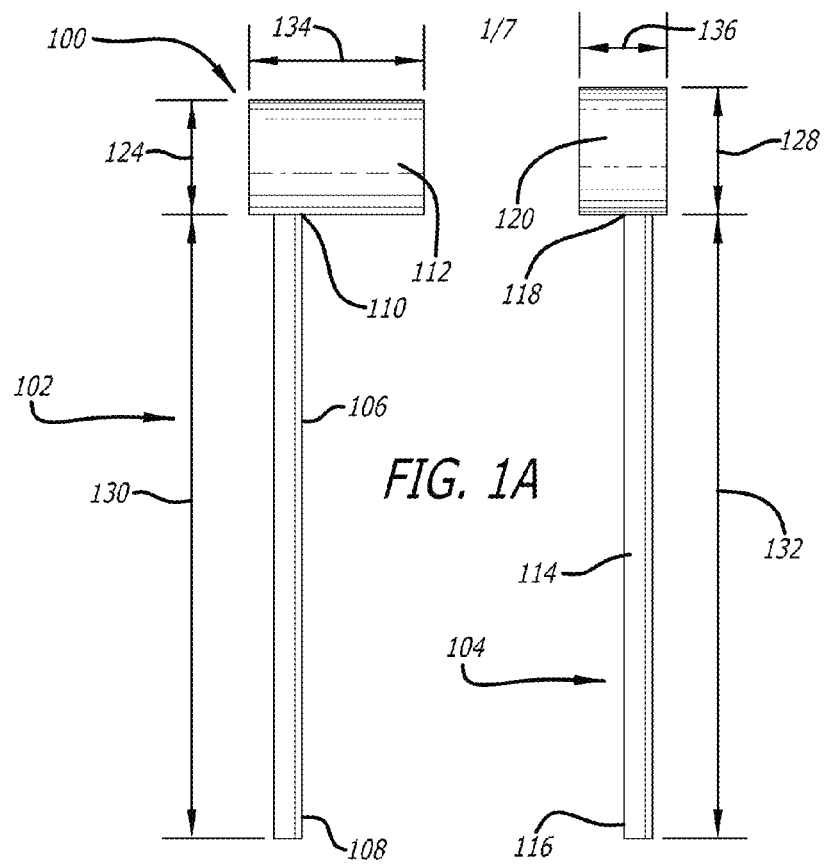
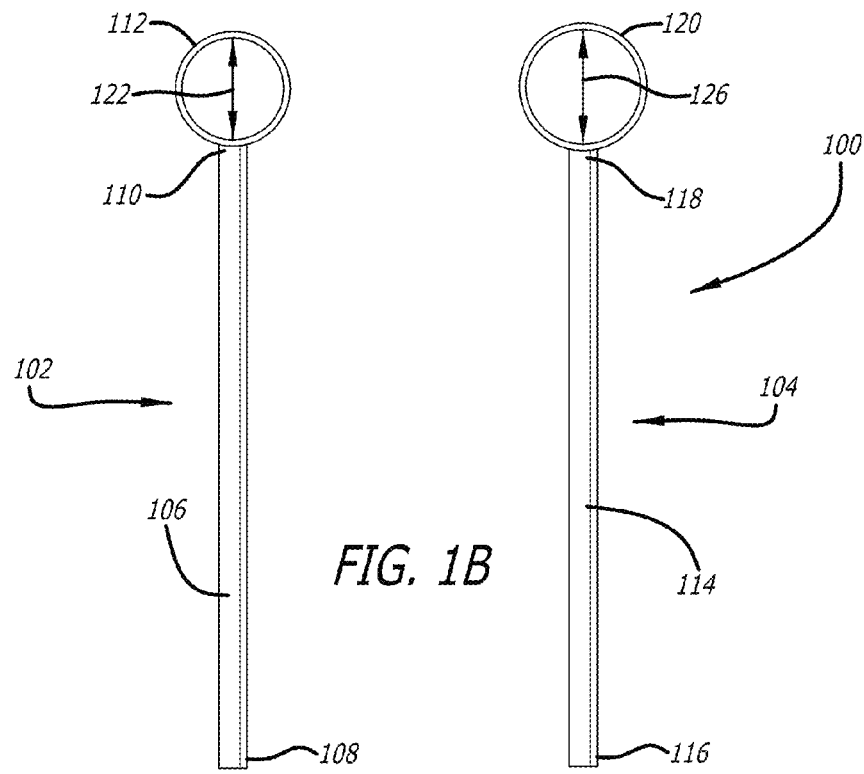

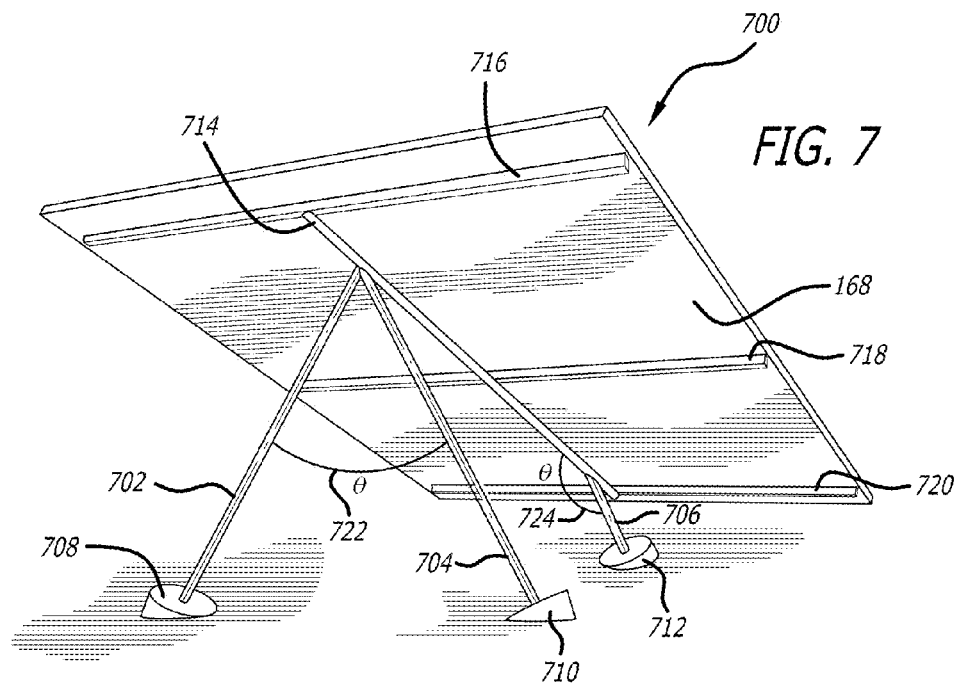

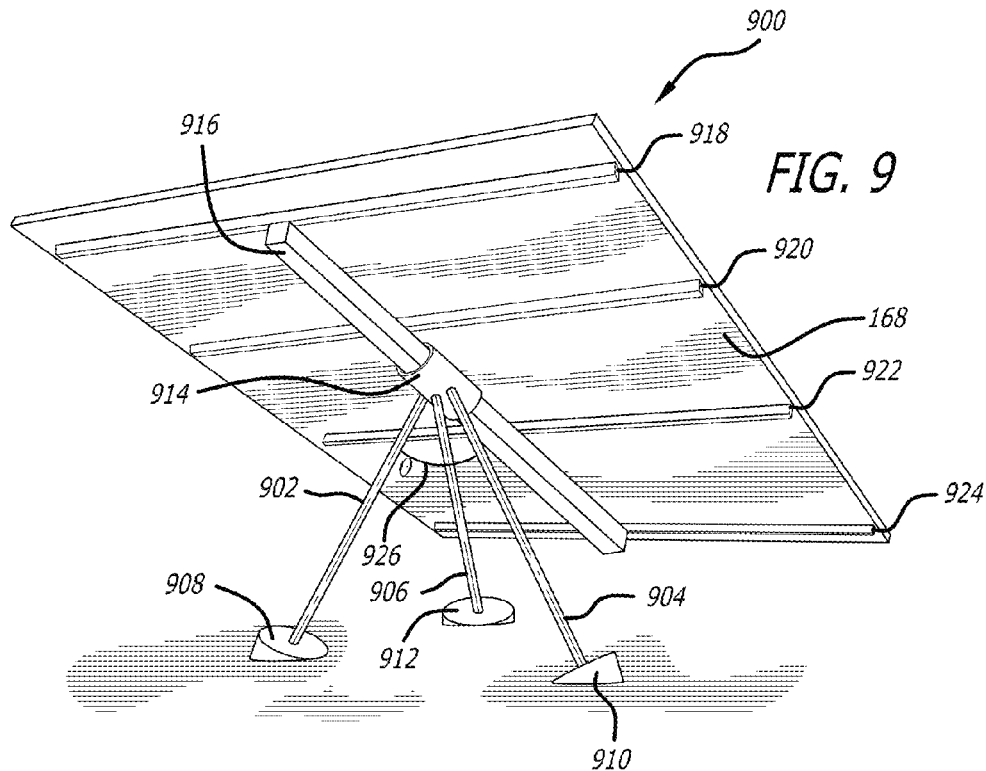
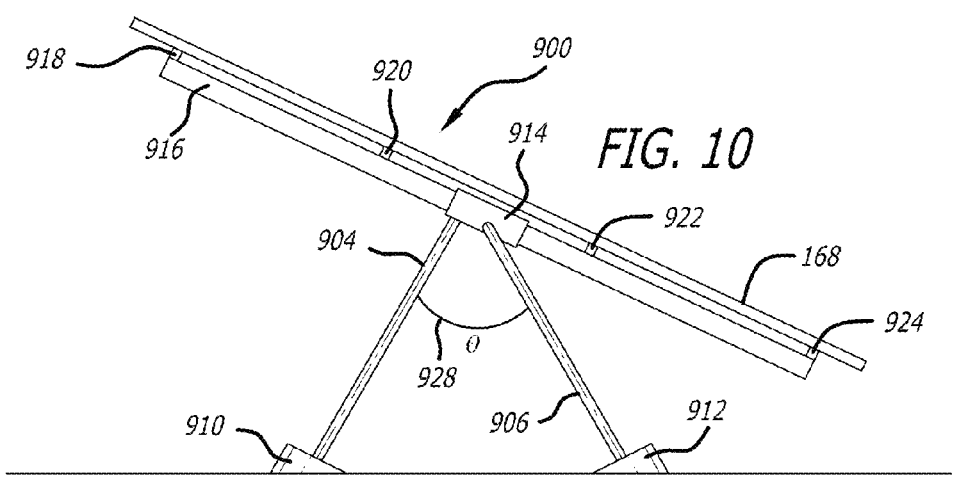

SOLAR APPARATUS SUPPORT STRUCTURES AND SYSTEMS

CROSS REFERENCE TO RELATED APPLICATIONS

The present application claims the benefit under 35 U.S.C. §119(e) to U.S. Provisional Application Ser. Nos. 61/526,188 filed Aug. 22, 2011 and 61/563,439 filed Nov. 23, 2011, the entire contents of all of which are hereby incorporated by reference in their entirety.

FIELD

Described herein are solar apparatus support structures and apparatus used to mount solar apparatus, modules and/or arrays.

BACKGROUND

As time passes, some renewable energy production costs are approaching nexus with hydrocarbon fuel power generating costs. As this occurs, faster and more cost effective methods of deploying renewable energy are needed to achieve parity. Described herein are solar apparatus supports and systems as well as methods of installing and using the apparatus and systems which can meet this need for faster and more cost effective methods of deploying renewable energy.

SUMMARY

Described herein are solar apparatus support structures and components used to mount solar apparatus, modules and/or arrays. The support structures can comprise a first arm including a first linear portion and a first coupling section; and a second arm including a second linear portion and a second coupling section; wherein the first coupling section can be sized to at least partially fit within the second coupling section.

Also described herein are methods of installing one or more solar support structures comprising: adhering a first linear portion of a first arm including a first coupling section to a first foundation and a second linear portion of a second arm including a second coupling section to a second foundation thereby forming a torque tube support by associating the first coupling section and the second coupling section; inserting a torque tube through the first coupling section and the second coupling section; and attaching one or more solar apparatus to the torque tube.

In other embodiments, the first linear portion and the second linear portion can be separated by an angle of about 60 degrees.and/or the first linear section and the second linear section can have a similar length. In some embodiments, the methods can be repeated at least once and/or can include fitting and affixing the first coupling section within the second coupling section. In further embodiments, the methods can include bonding the first linear portion to the first shallow column foundation and the second linear portion to the second shallow column foundation using an adhesive.

In one embodiment, the support structures can further comprise a first foundation and a second foundation. In some embodiments, the first linear portion and the second linear portion can be tubular and/or the first coupling section and the second coupling section can be tubular.

In other embodiments, the first arm can be coupled to the first foundation and the second arm is coupled to the second foundation and/or the first foundation and the second foundation can be situated at an angle of about 60 degrees. Further, the first coupling section and second coupling section can meet at a pinnacle of the angle.

Further, in some embodiments, the first foundation and the second foundation can each comprise a reaction plate, a tensioning rod, compacted aggregate and a top plate. In other embodiments, the first arm can attach to a first tensioning rod anchored by the first foundation and the second arm can attach to a second tensioning rod anchored by the second foundation. In some embodiments, the attachment can be accomplished with an adhesive.

Also described are solar apparatus support structures comprising: a first arm attached to a first foundation and a torque tube coupling section, a second arm attached to a second foundation and the torque tube coupling section, and a third arm attached to a third foundation and the torque tube coupling section, wherein the first foundation, the second foundation, and the third foundation are located at the points of a triangle.

Also described are solar apparatus support structures comprising: a first arm attached to a first foundation and a linear support member at a first point, a second arm attached to a second foundation and the linear support member at the first point, and a third arm attached to a third foundation and the linear support member at a second point, wherein the first foundation, the second foundation, and the third foundation are located at triangular points.

BRIEF DESCRIPTION OF THE DRAWINGS

FIGS. 1A-1C illustrate first support arm and second support arm. FIG. 1A is a front view, FIG. 1B is a side view and FIG. 1C is a perspective view.

FIG. 7 illustrates a rear perspective view of another solar apparatus support structure.

FIG. 8 illustrates a side view of the solar apparatus support structure of FIG. 7.

FIG. 9 illustrates a rear perspective view of another solar apparatus support structure.

FIG. 10 illustrates a side view of the solar apparatus support structure of FIG. 9.

DETAILED DESCRIPTION

Described herein are solar apparatus support structures, components and systems as well as methods of installing and using the solar apparatus support structures, apparatus and systems. A solar apparatus support structure as described herein can comprise a first arm including a first linear portion and a first coupling section; a second arm including a second linear portion and a second coupling section; a first foundation; and a second foundation, wherein the first coupling section is sized to at least partially fit within the second coupling section.

Figure 1C:
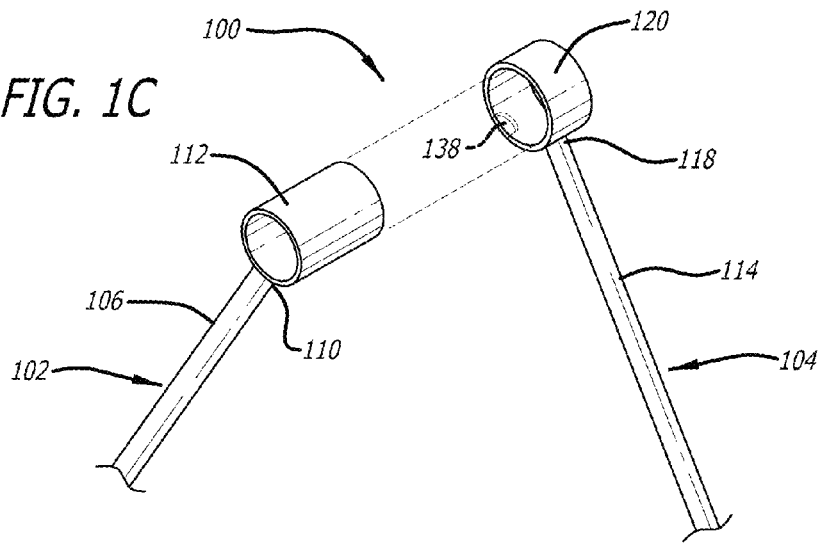

One embodiment of a solar apparatus support structure 100 according to the present description is illustrated in FIGS. 1A-1C. In FIGS. 1A and 1B, first arm 102 and second arm 104 are illustrated. First arm 102 can include first linear portion 106 having a first end 108 and a second end 110 terminating at first coupling section 112. Likewise, second arm 104 can include second linear portion 114 having a first end 116 and a second end 118 terminating at second coupling section 120. First coupling section 112 can have a first inner diameter 122 and a first outer diameter 124, and second coupling member can have a second inner diameter 126 and a second outer diameter 128. In some embodiments, first linear portion 106 has a first length 130 and second linear portion 114 has a second length 132.

In some embodiments, first linear portion 106 and second linear portion 114 can have any shape that provides ample structural support. For example, shapes can include cross sections that are circular, square, rectangular, trapezoidal, oval, torx, diamond, triangular, and the like. Further, first linear portion 106 and second linear portion 114 can be hollow, substantially hollow or solid. For example, if plastic, an arm may be solid to supply more support. A linear portion, if hollow or substantially hollow can also include internal bracing to increase support potential without substantially increasing overall weight of an arm compared to an arm with a solid linear portion.

Further, first arm 102 and second arm 104 can be formed of materials supplying sufficient forces to support the required structural load. For example, first arm 102 and second arm 104 can be made of plastic, glass fiber reinforced polymer (GFRP), carbon fiber, metal, metal alloy or a combination thereof. Examples of metals include aluminum, titanium, iron, and other common structural metals. Examples of metal alloys can include steel.

In some embodiments, first length 130 and second length 132 are the same. In other embodiments, first length 130 can be longer than second length 132 or second length 132 can be longer than first length. As will be described, each length can vary depending on factors such as, but not limited to, terrain. First length 130 and second length 132 can each independently be from about 1 ft to about 20 ft, about 3 ft to about 15 ft, or from about 5 ft to 10 ft. Or, first length 130 and second length 132 can each independently be about 1 ft, about 2 ft, about 3 ft, about 4 ft, about 5 ft, about 6 ft, about 7 ft, about 8 ft, about 9 ft, about 10 ft, about 11, ft, about 12 ft, about 13 ft, about 14 ft, about 15 ft, about 16 ft, about 17 ft, about 18 ft, about 19 ft, about 20 ft or more.

In some embodiments, first coupling section 112 and second coupling section 120 can be complementarily sized and shape. In some embodiments, the shapes can include, but are not limited to tubular, square, triangular, pentagonal, hexagonal, heptagonal, octagonal, torx and the like. For non-tubular shapes, first coupling section 112 and second coupling section 120 can be oriented in a locking position at one of the angular degrees of a shape. For example, pentagonal coupling sections can have five possible locking positions. Further if non-tubular support sections are used, a tubular torque tube can be used to allow spinning or rotation of the tube. However, in other embodiments, the torque tube can complement the support sections to lock the torque tube in place.

In one embodiment, first coupling section 112 is sized so that first outer diameter 124 fits within second inner diameter 126 of second coupling section 120. In some embodiments, first outer diameter 124 of first coupling section 112 can be sized to fit within about 0.01 inches, about 0.05 inches, about 0.1 inches, about 0.5 inches, about 1 inch or about 5 inches of second inner diameter 126. Gaps created between first outer diameter 124 and second inner diameter 126 can be filled with materials known in the art, for example, greases, lubricants, plastics, hydrogels, bearings, bushings, rubber or the like. In other embodiments, the first coupling section 112 can be welded, bonded, or compression bolted or screwed to the second coupling section 120. In other embodiments, first coupling section 112 fits far enough into second coupling section 120 that first linear portion 106 can fit into optional notch 138 in second coupling section 120.

In other embodiments, the opposite of the above can be provided. In other words, first inner diameter 122 can be larger than second outer diameter 128.

In order to provide an overlapping surface when first coupling section 112 and second coupling section 120 are married, first coupling section 112 can have longer cross-section 134 than accompanying cross-section 136 of second coupling section 120. When married, first coupling section 112 can be placed within second coupling section 120 and longer cross-section 134 can protrude into the shorter, accompanying cross-section 136. In some embodiments, first coupling section 112 can protrude beyond second coupling section 120, substantially through second coupling section 120, all but 1 inch through second coupling section 120, halfway through second coupling section 120, or a quarter through second coupling section 120.

Figure 2:
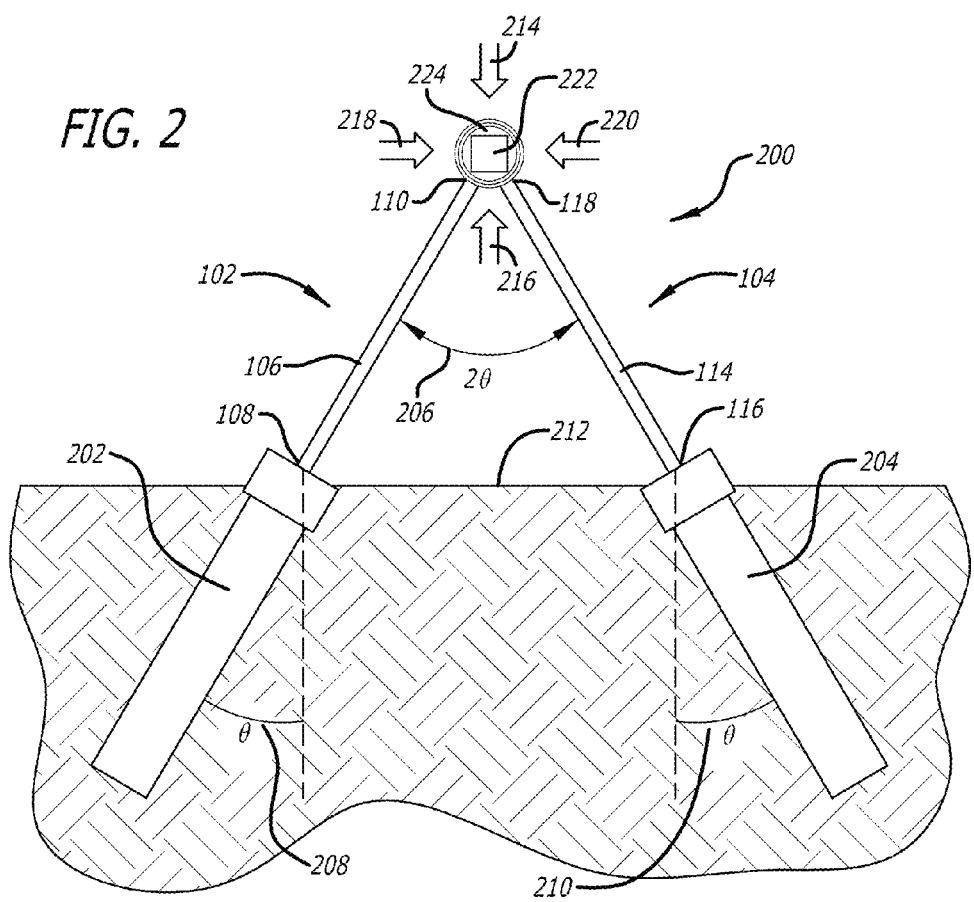
FIG. 2 illustrates a side view of an assembled solar apparatus support structure according to the present description.

As illustrated in FIG. 2, first arm 102 is attached to first foundation 202 and second arm 104 is attached to second foundation 204. Each foundation can independently be any foundation known in the art. For example, a foundation can be a cement slab, ballasted mount, an anchor, a post foundation pier, or the like. In one embodiment, the foundation can be a post tensioned shallow gravel column foundation as described in Applicants U.S. provisional patent application No. 61/526,192, which is incorporated herein in its entirety for all that it discloses regarding post tensioned shallow gravel column foundations. A post tensioned shallow gravel column foundation can include a reaction plate coupled to a tensioning rod, a column of compacted aggregate, a top plate and a securing means such as a bolt atop the top plate to maintain the force stored within the aggregate column. The tension rod generally can protrude out the top of the foundation itself.

Figure 3:
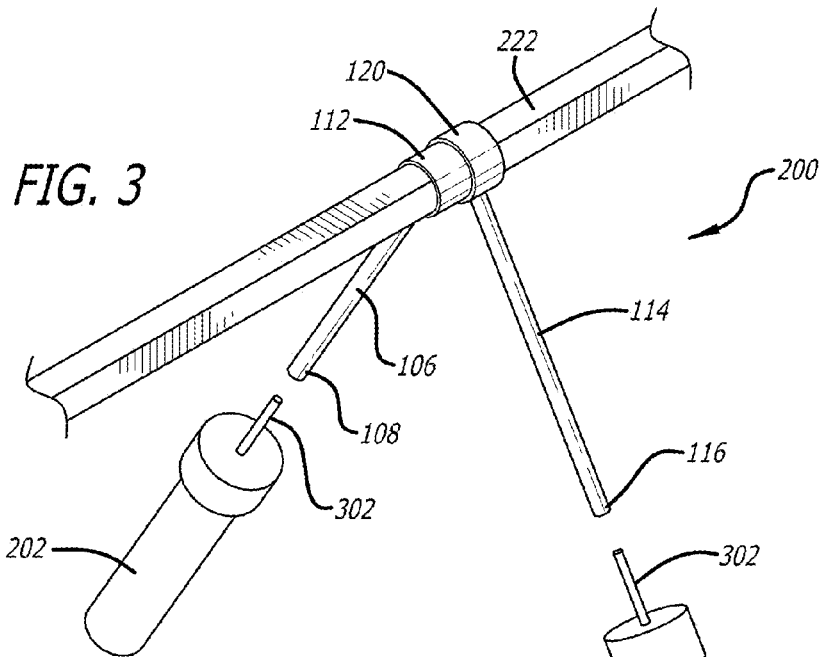
FIG. 3 illustrates a top perspective view of an assembled solar apparatus support structure including a torque tube exploded from its foundations.
Figure 4:
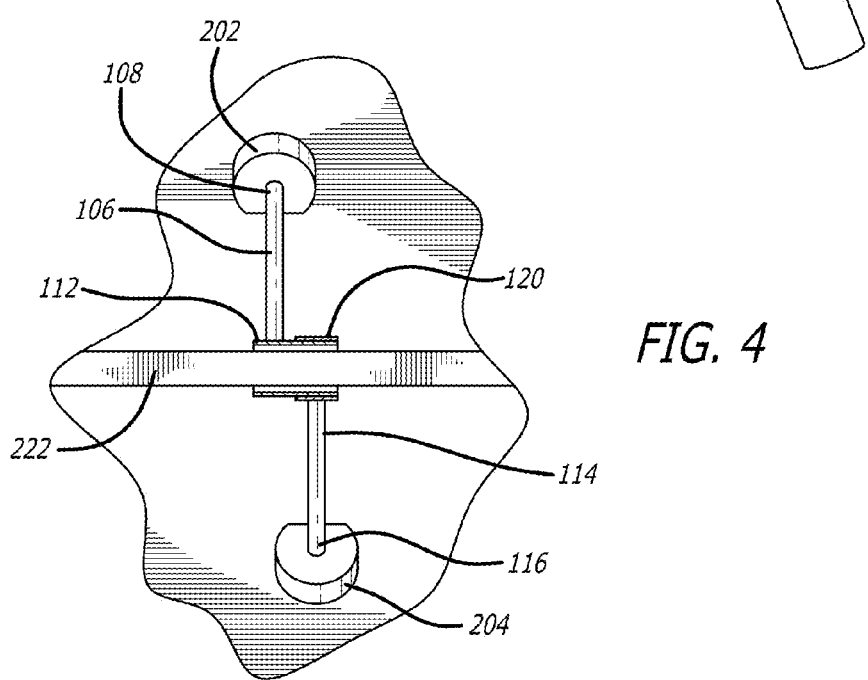
FIG. 4 illustrates a top view in partial cross-section.

Further, first arm 102 and second arm 104 can be attached to first foundation 202 and second foundation 204 respectively by any means known in the art. In one embodiment, first foundation 202 and second foundation 204 can have tensioning rod 302 protruding from the foundation (FIG. 3). Tensioning rod 302 can be sized such that it can fit within the inner dimensions of linear portion 114 at first end 116. As such, in some embodiments, a linear portion of an arm can be slid over a tensioning rod and secured in place. In one embodiment, adhesive is applied to tensioning rod 302, and then, linear portion 114 is slid over tensioning rod 302 securing it in place. Suitable fasteners or adhesives can include industrial grade fasteners, single or two part urethane and/or single or two part epoxy adhesives.

Other securing methods such as bolting, screwing, a retractable pin, a removable pin, clamping and the like can be used to couple an arm to a foundation. For example, tensioning rod 302 can be threaded, first end 116 of linear portion 114 can be threaded on the interior (inside diameter threads), and the two can be screwed together.

In order for the marriage of first coupling section 112 and second coupling section 120, first arm 102 and second arm 104 can be offset by angle 206 (FIG. 2). Angle 206 can be varied depending on terrain, height desired, structural requirement and the like. Further, in order to attain angle 206, first foundation 202 and second foundation 204 can be provided at first angle 208 and second angle 210 relative to perpendicular with surface 212. Generally, the sum of first angle 208 and second angle 210 can add to angle 206.

Angle 206 can be of any degree as long as the final structure can support its intended load. In aspects of this embodiment, angle 206 can be about 30 degrees, about 40 degrees, about 50 degrees, about 60 degrees, about 70 degrees, about 80 degrees, about 90 degrees, about 100 degrees, about 110 degrees, about 120 degrees, about 130 degrees or about 140 degrees or more. In one embodiment, angle 206 can be between about 50 and about 70 degrees. In other embodiments, angle 206 can be about 60 degrees.

In such an angled configuration, an installed solar apparatus support structure 200 as described herein can resist a vertical (compressive) load 214, uplift (tensile) load 216 and horizontal loads 218 and 220 which can support the structures placed atop or on the support structure.

Figure 5:
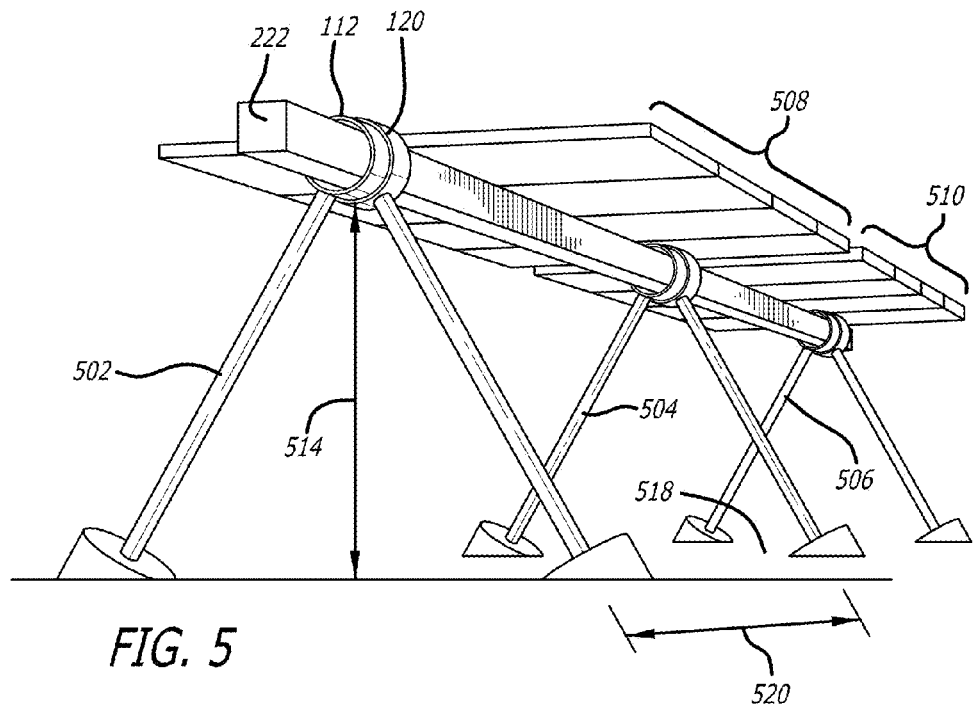
FIG. 5 illustrates a perspective view of an assembled solar apparatus including a support system according to the present description.
Figure 6:
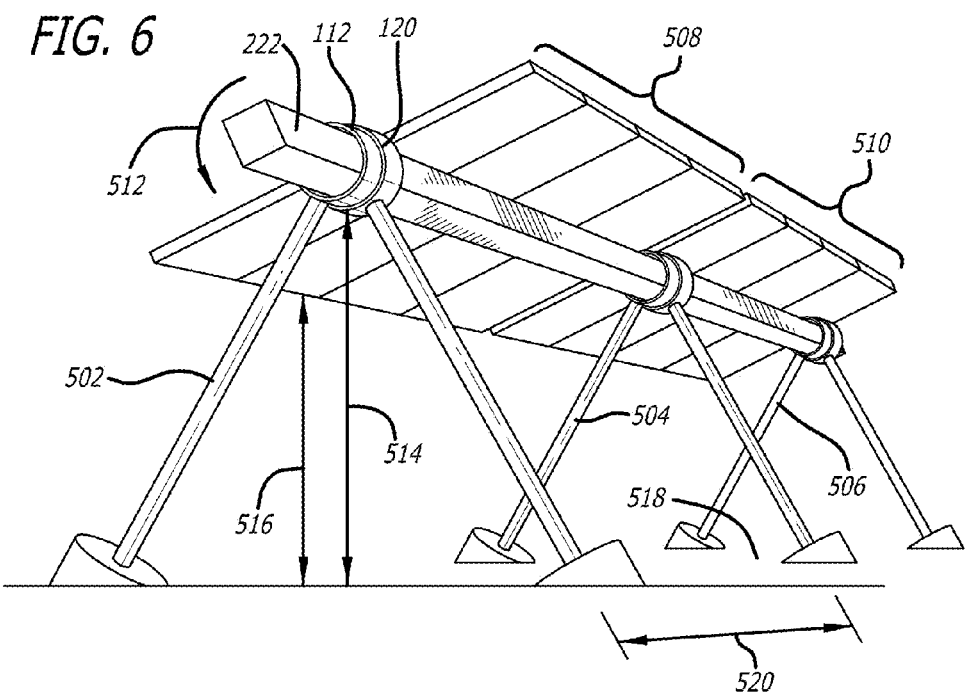
FIG. 6 illustrates a perspective view of a rotated solar apparatus including a support system of FIG. 5.

As illustrated in FIGS. 2-6, once a support structure has been erected, a solar torque tube 222 can be inserted into and through first coupling section 112. Solar torque tube 222 can be round or facetted having 3 or 4 or more sides. Two or more support structures can be utilized to support a solar torque tube 222 depending on the length of a torque tube and/or the weight and loads applied by the modules or arrays. For example, as illustrated in FIGS. 5 and 6, first solar apparatus support 502, second solar apparatus support 504 and third solar apparatus support 506 can all be used together as a support system to support first solar apparatus 508 and second solar apparatus 510. Each of first solar apparatus 508 and second solar apparatus 510 can include one or more solar apparatus, solar apparatus arrays, solar modules, solar thermal panels, solar thermal modules, solar thermal arrays, mirrors used in solar thermal energy production, mirrors used for solar furnace systems, mirrors in solar energy collection systems and the like or any component that can track the sun, and combinations thereof. Further, each of first solar apparatus 508 and second solar apparatus 510 can have a planar shape, a concave shape or a convex shape.

Further, solar torque tube 222 can spin 512 within first coupling section 112 and second coupling section 120 generally by the aid of a connecting strut actuated by a motor (not illustrated) so that the solar apparatus can more efficiently track the sun. Free area 224 that may exist between first coupling section 112 and/or second coupling section 120, and solar torque tube 222 can be filled or not filled, and if filled can include bushings, bearings, o-rings, plastics, grease, a combination thereof, or the like.

The entire solar system, e.g. a solar apparatus support system including one or two or more solar support structures, a solar torque tube, and one or more solar apparatus, can have a height sufficient to allow use of the surrounding land. Unlike most solar fields which require large concrete foundations and low hanging equipment, the present systems allow the equipment (e.g. solar array torque tube and one or more solar apparatus) to sit at height 514. Even when solar torque tube 222 is spun to its most extreme, second height 516 can allow use of the land. Further, the use of small post foundations, land 518 is freely usable, for example, to store equipment, allow sheep or cattle to graze, grow crops, build structures, and the like.

Also, by varying the length of first length 130 and second length 132, the x and y location of the first and second coupling sections or torque tube support can be adjusted. The different mating processes described of the extending tension rod and the linear portion of each arm permits such an adjustment. This flexibility effectively changes the length of two sides of a triangle accommodating field adjustments and can achieve a required high tolerance demand.

Further, by varying the lengths of first length 130 and second length 132, differently elevated terrians can be used. Grading of the solar field may not be required if the lengths of the arms are adjusted to keep a torque tube leveled on a given line. For example, if the terrain is elevated where one leg and foundation are to be installed, that leg can be made shorter than the accompanying leg thereby allowing installation without surface grading.

Further still, each arm can be cut to size on site depending on the needs of a given support structure and surrounding terrain. For example, if an arm is a foot too long to properly orient a torque tube, a foot can simply be cut from the linear portion and the arm installed as described.

The spacing between solar apparatus supports can vary depending on, for example, variations in terrain, weight of load, module or array applied loads, strength of the torque tube, diameter of arms, wall thickness of arms, arm shape, and the like, and combinations thereof. Separation distance 520 can be about 4 m to about 6 m, about 2 m to about 8 m, or from about 4 m to 10 m. In some embodiments, separation distance 520 can be about 4 m, about 5 m, about 6 m, about 7 m, about 8 m, about 9 m, about 10 m, about 11 m, about 12 m or more. In one embodiment, separation distance 520 can be 4.25 m.

The structures and systems described herein can comprise two arms which form a triangular unit or truss converting vertical and horizontal forces into axial loads. The geometry of the truss can define how much tension and compression can be transferred to each member thus allowing the designer to reduce the axial load on one member while increasing it in the other as needed. The truss can also be structurally more efficient than a single pier or post support system, and as a result, the deflection due to the lateral loads can be minimized. This property of conversion can further be realized when using shallow column post tensioned foundations.

Another embodiment of a solar apparatus support structure is illustrated in FIGS. 7-8. Solar apparatus support structure 700 includes first leg 702, second leg 704, and third leg 706. Each of first leg 702, second leg 704, and third leg 706 can be attached to first foundation 708, second foundation 710, and third foundation 712 respectively as described herein. The arms can be attached to a torque tube using a coupling section as described or can be attached directly to linear support member 714. Linear support member 714 can support one or more joists. For example, first joist 716, second joist 718, and third joist 720 can support at least one solar apparatus 168.

One or more joist can aid in distributing the loads provided by the at least one solar apparatus 168. Joists can also be used with solar apparatus support structure 700. In such an embodiment, one or more joists can be installed between a torque tube or linear support member and a solar apparatus.

In solar apparatus support structure 700 angle 722 can be about 30 degrees, about 40 degrees, about 50 degrees, about 60 degrees, about 70 degrees, about 80 degrees, about 90 degrees, about 100 degrees, about 110 degrees, about 120 degrees, between about 30 degrees and about 90 degrees, between about 40 degrees and about 70 degrees, between about 50 degrees and about 70 degrees, between about 30 degrees and about 70 degrees, or between about 50 degrees and about 90 degrees. Angle 724 can be about 90 degrees, about 100 degrees, about 110 degrees, about 120 degrees, about 130 degrees, about 140 degrees, about 150 degrees, about 160 degrees, about 170 degrees, between about 90 degrees and about 170 degrees, between about 110 degrees and about 160 degrees, between about 120 degrees and about 140 degrees, between about 110 degrees and about 130 degrees, or between about 100 degrees and about 140 degrees. Angle 726 can be about 30 degrees, about 40 degrees, about 45 degrees, about 50 degrees, about 60 degrees, about 70 degrees, about 80 degrees, about 90 degrees, about 100 degrees, about 110 degrees, about 120 degrees, about 130 degrees, about 140 degrees, about 150 degrees, about 160 degrees, about 170 degrees, between about 45 degrees and about 170 degrees, between about 60 degrees and about 150 degrees, between about 90 degrees and about 140 degrees, between about 110 degrees and about 130 degrees, or between about 45 degrees and about 100 degrees.

As with other solar apparatus support structure described, the lengths of the legs and angles used in solar apparatus support structure 700 can be varied for particular terrain or lengthened to allow use of the land under the solar apparatus 168.

Another solar apparatus support structure is illustrated in FIGS. 9-10. Solar apparatus support structure 900 includes first leg 902, second leg 904, and third leg 906. Each of first leg 902, second leg 904, and third leg 906 can be attached to first foundation 908, second foundation 910, and third foundation 912 respectively as described herein. The arms can be attached to torque tube coupling section 914. Torque tube coupling section 914 accommodate torque tube 916 which can be moved relative to torque tube coupling section 914 as described elsewhere herein. Torque tube 916 can support one or more joists. For example, first joist 918, second joist 920, third joist 922, and forth joist 924 can support at least one solar apparatus 168.

In solar apparatus support structure 900 angle 926 can be about 30 degrees, about 40 degrees, about 50 degrees, about 60 degrees, about 70 degrees, about 80 degrees, about 90 degrees, about 100 degrees, about 110 degrees, about 120 degrees, between about 30 degrees and about 90 degrees, between about 40 degrees and about 70 degrees, between about 50 degrees and about 70 degrees, between about 30 degrees and about 70 degrees, or between about 50 degrees and about 90 degrees. Angle 928 can be about 30 degrees, about 40 degrees, about 45 degrees, about 50 degrees, about 60 degrees, about 70 degrees, about 80 degrees, about 90 degrees, about 100 degrees, about 110 degrees, about 120 degrees, about 130 degrees, about 140 degrees, about 150 degrees, about 160 degrees, about 170 degrees, between about 45 degrees and about 170 degrees, between about 60 degrees and about 150 degrees, between about 90 degrees and about 140 degrees, between about 110 degrees and about 130 degrees, or between about 45 degrees and about 100 degrees.

As with other solar apparatus support structure described, the lengths of the legs and angles used in solar apparatus support structure 900 can be varied for particular terrain or lengthened to allow use of the land under the solar apparatus 168.

The support structures described herein can support vertical loads of about 500 N to about 100,000N, about 10,000 N to about 90,000 N, about 20,000 N to about 80,000 N, or about 45,000 N to about 60,000 N. In one embodiment, the structures resist a vertical load of about 9,800 N. The structures described can support horizontal loads of about 5,000 N to about 45,000 N, or about 10,000 N to about 37,500 N, or about 20,000 N to about 30,000 N. In one embodiment, the structures can resist a horizontal load of about 7,900 N.

The support structures described herein can also support total axial loads of about 1,000N to about 50,000N, about 5,000 N to about 45,000 N, about 10,000 N to about 37,500 N, or about 20,000 N to about 30,000 N. In one embodiment, solar apparatus support structures can resist an axial load of about 13,500 N.

Further, the support structures and systems described herein can be light weight. A system can collectively weigh less than about 1,000 lbs, less that about 500 lbs, less than about 250 lbs, less than about 100 lbs, less than about 50 lbs, less than about 30 lbs, less than about 20 lbs, or less than about 10 lbs. In other embodiments, the collective weight is between about 20 lbs and about 40 lbs, about 50 lbs and about 500 lbs, or about 100 lbs and about 250 lbs. The light weight of the arms allows one or more skilled artisan(s) to potentially lift and install the arms without the aid of heavy machinery.

Methods of installing solar apparatus support structures and systems are also described. As a first step, a site for installing a solar apparatus, whether it be a single array or panel or an entire farm, is determined. As described above, the present systems can be installed high enough allowing for more flexibility in placement.

Once a location has been determined, one or more foundations can be installed in order to attach a solar apparatus support structure as described. A foundation can include, but is not limited to, a cement slab, a ballasted mount, an anchor, a post foundation pier, a post tensioned shallow gravel column foundation as described in Applicants U.S. provisional patent application No. 61/526,192, or the like. In one embodiment, two shallow gravel column foundations can be installed at an appropriate angle relative to one another. In one embodiment, that angle can be about 60 degrees. In some embodiments, the foundations can be guided during installation by a laser sight, sonar system, GPS or total station machine control systems or the like.

Once the shallow gravel column foundations are installed, a tensioning element such as a rod, connecting dowel or bolt can be structured to emanate from the top of each foundation. Generally, the tensioning element can protrude at a distance that can provide the structure with the ability to sustain a given load. This protrusion can be about 2 inches, about 6 inches, about one foot, about two feet, about three feet or more.

In other embodiments, a tensing element can be bolted or glued to an existing foundation or to a newly formed concrete pad, helical or driven pier, or other foundation system. In other embodiments, the arms can be attached directly to a foundation not including a tensioning rod, dowel, or bolt.

At this point, adhesive can be either placed on the tensioning rod, within the internal cavity of a support arm or both, and the support arm can be slipped over the tensioning rod and bonded into place. Then, the coupling sections of the two support arms can be joined as described above (e.g. first inside the second). The two coupled support arms can then be further positioned onto the two tensioning rods permitting accurate alignment and final bonding in place thereby securing the support system.

Then, a second and subsequent structure(s) can be installed until the desired number of structures are installed. After installation of an appropriate number of supports, a torque tube can be slid through each support as described above, the solar apparatus can be added to the torque tube, and a motor can be added to the system. In some embodiments, the solar apparatus can be fixed and does not require a motor.

The systems and methods described herein can save time when compared to common methods and systems. For example, the present systems and methods can use post tensioned shallow gravel foundations in contrast to full concrete, helical or driven steel pier foundations for solar apparatus arrays currently used in the art. Current concrete foundations can take several days to cure before solar arrays can be assembled on top. The present systems and methods' foundations can be installed in a matter of hours and solar arrays installed within a day or two. In some embodiments, the present systems and methods can save about 2 days, about 3 days, about 4 days, about 5 days, about 6 days, about a week, about 2 weeks about 3 weeks or about 4 weeks when compared to currently used systems and methods.

Further, the present systems can be easily decommissioned. Current concrete foundation systems require elaborate machinery and substantial haul-away efforts when the solar arrays are decommissioned. Such efforts can require substantial amounts of time and money. For example, deep driven piers (4 to 5 m) require substantial excavation and power requirements to remove the piers. In contrast, the present systems can be decommissioned in less time and for less money. In some embodiments, no elaborate machinery is required to decommission the present systems. In some embodiments, all that is needed is a small excavator. The support structure materials can be removed by hand and are completely recyclable. In other embodiments, no jack-hammering is required with decommission of the present systems.

A small excavator can use less than about 70 hp, about 60 hp, about 50 hp or about 40 hp of flywheel power to decommission the present systems. The small excavator can use less than about 70 kN, about 50 kN, about 40 kN, about 30 kN, about 20 kN or about 10 kN or drawbar pull to decommission the present systems.

The above can translate into savings in both time and/or money. For example, a two day job using the present systems and methods can be substantially less expensive than a full concrete foundation system taking a week or more to complete. Further, the materials alone to construct the present systems can be lower priced than those used in current systems. For example, because the present systems and methods do not use steel reinforced concrete in some embodiments, there can be no need for expensive materials and machinery to excavate, pour and cure concrete (e.g. aggregate, water, rebar, wood framing, mixers, pumping systems, etc.). In some embodiments, all that is needed to install a foundation according to the present description is a reaction plate and rod assembly, aggregate, a top plate, a hydraulic powered hammer, a mandrel and optionally a casing for the mandrel.

EXAMPLE 1

Based on the above description, many different configurations can be envisioned by one skilled in the art. The following are non-limiting designs that can be used to determine generic or typical design characteristics useful in calculating loads and structural member sizing.

A system based on a site located in Montalto di Castro, Italy at 42°21'36" N and 11°31'19" E can be installed. One or more of the following design parameters can be utilized.

TABLE 1

|  | Design 1 | Design 2 | Design 3 |
|---|---|---|---|
| Spacing of feet at ground (A) | 1,400 mm | 900 mm | 2,920 mm |
| Height of tube center above ground (B) | 1,200 mm | 1,200 mm | 2,500 mm |
| Distance from ground to tube center (C) | 1,418 mm | 1,290 mm | 2,923 mm |
| Arm length (D) | 1,216 mm | 1,131 mm | 2,722 mm |
| Arm angle to vertical (E) | 32° | 22° | 31° |
| Tensioning Element length (F) | 1,524 mm | 1,524 mm | 1,524 mm |
| Top plate depth (G) | 178 mm | 114 mm | 178 mm |
| Separation distance (H) | 4,250 mm | 4,250 mm | 4,250 mm |
| Approximate axial arm load at horizontal 7,880 N (I) and vertical 9,800 N loads (J) | 13,492 N | 16,454 N | 13,487 N |

Figure 11:
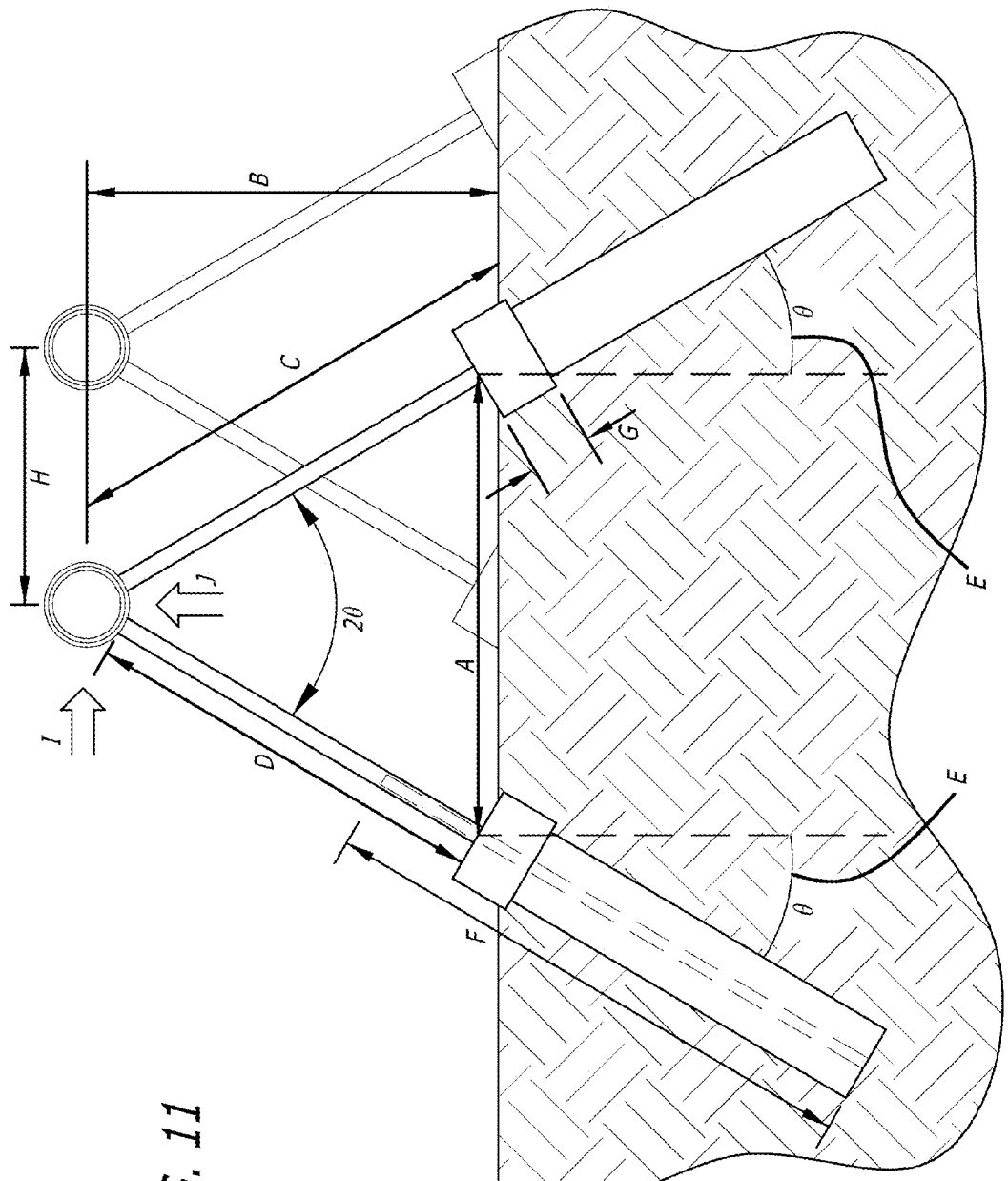
FIG. 11 illustrates parameters of Table 1.

Table 1 tabulates measurements and load values for designs 1, 2 and 3. FIG. 11 aids in illustrating which measurements are being made. Design 3 can elevate solar apparatus high enough to allow use of the land under them. Design 2 can save land by requiring less space to install.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, references have been made to patents in this specification. The above-cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

I claim:

1. A solar apparatus support structure comprising:
   a first arm including a first linear portion including a first end and a second end and a first coupling section;
   a second arm including a second linear portion including a first end and a second end and a second coupling section; and
   a torque tube;
   wherein the second end of the first linear portion is configured to terminate at the first coupling section;
   wherein the second end of the second linear portion is configured to terminate at the second coupling section;
   wherein the first coupling section includes a first cross sectional area sized to at least partially fit within the second coupling section including a second cross sectional area; and
   wherein the first coupling section includes a first axial cross section and the second coupling section includes a second axial cross section, wherein the first axial cross section is longer than the second axial cross section; and
   wherein the first coupling section and the second coupling section are configured to allow insertion of the torque tube, wherein the torque tube is configured to spin within the first coupling section and the second coupling section once the solar apparatus support structure is erected.

2. The solar apparatus support structure according to claim 1, further comprising a first foundation and a second foundation.

3. The solar apparatus support structure according to claim 1, wherein the first linear portion and the second linear portion are tubular.

4. The solar apparatus support structure according to claim 1, wherein the first coupling section and the second coupling section are tubular.

5. The solar apparatus support structure according to claim 2, wherein the first arm is coupled to the first foundation and the second arm is coupled to the second foundation.

6. The solar apparatus support structure according to claim 2, wherein the first foundation and the second foundation are situated at an angle of about 60 degrees relative to vertical.

7. The solar apparatus support structure according to claim 6, wherein the first coupling section and second coupling section meet at a pinnacle of the angle.

8. The solar apparatus support structure according to claim 2, wherein the first foundation and the second foundation each comprise a reaction plate, a tensioning rod, compacted aggregate and a top plate.

9. The solar apparatus support structure according to claim 2, wherein the first arm attaches to a first tensioning rod anchored by the first foundation and the second arm attaches to a second tensioning rod anchored by the second foundation.

10. The solar apparatus support structure according to claim 9, wherein attachment is accomplished with an adhesive.

11. A solar apparatus support structure comprising:
    a first arm including a first linear portion and a first coupling section;
    a second arm including a second linear portion and a second coupling section; and
    a torque tube
    wherein the first coupling section has a first cross sectional area that is sized to at least partially fit within a second cross sectional area of the second coupling section and wherein the first coupling section and the second coupling section are configured to allow insertion of the torque tube, wherein the torque tube is configured to spin within the first coupling section and the second coupling section once the solar apparatus support structure is erected.

12. The solar apparatus support structure according to claim 11, further comprising a first foundation and a second foundation.

13. The solar apparatus support structure according to claim 11, wherein the first linear portion and the second linear portion are tubular.

14. The solar apparatus support structure according to claim 11, wherein the first coupling section and the second coupling section are tubular.

15. The solar apparatus support structure according to claim 12, wherein the first arm is coupled to the first foundation and the second arm is coupled to the second foundation.

16. The solar apparatus support structure according to claim 12, wherein the first foundation and the second foundation are situated at an angle of about 60 degrees relative to vertical.

17. The solar apparatus support structure according to claim 16, wherein the first coupling section and second coupling section meet at a pinnacle of the angle.

* * * * *